UNITED STATES PATENT OFFICE.

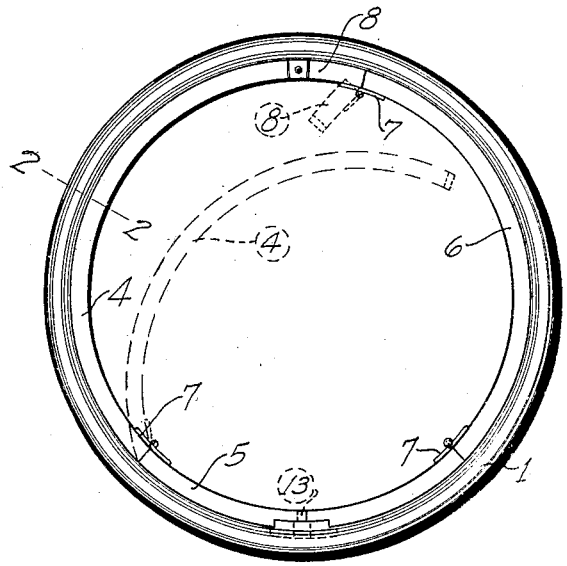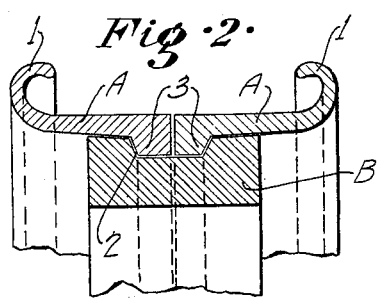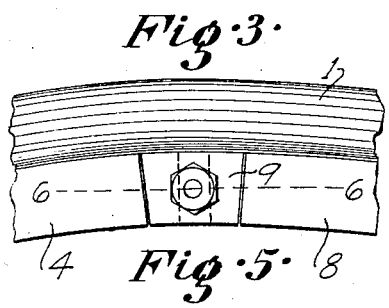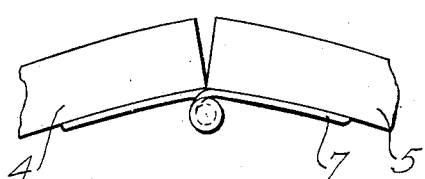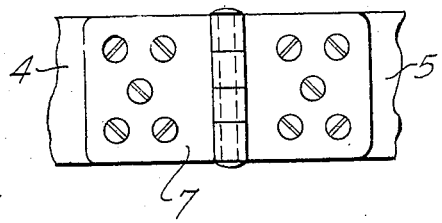

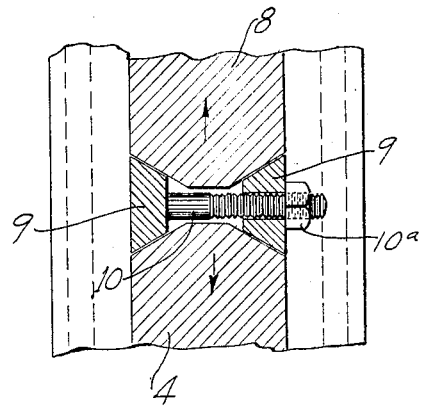
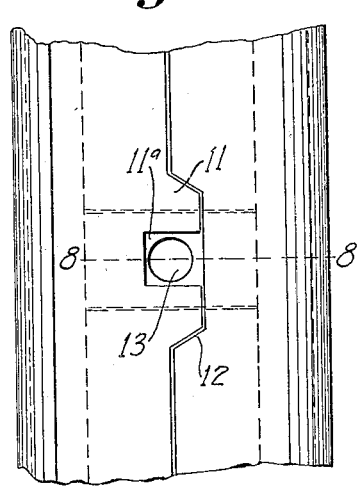
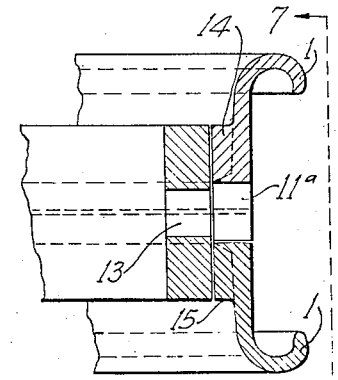
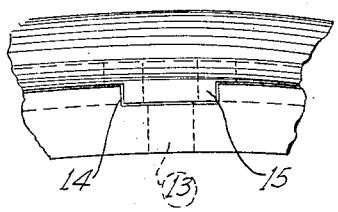

NICHOLAS SCHENK, OF ST. LOUIS, MISSOURI.

DEMOUNTABLE WHEEL-RIM.

1,386,368.  Specification of Letters Patent.  Patented Aug. 2, 1921.

Application filed March 29, 1920. Serial No. 369,824.

*To all whom it may concern:*

Be it known that I, NICHOLAS SCHENK, a citizen of the United States, residing at St. Louis, Missouri, have invented a certain new and useful Improvement in Demountable Wheel-Rims, of which the following is a full, clear, and exact description, such as will enable others skilled in the art to which it appertains to make and use the same.

This invention relates to demountable wheel rims of the kind used on wheels equipped with pneumatic tires, and particularly to demountable rims of the type in which the tire carrying portion of the rim is split circumferentially so as to form two sections that can be separated to permit the inner tube of the tire to be inserted or removed from the outer casing easily and without liability of injuring the outer casing.

The main object of my invention is to provide a demountable rim of the type referred to that is exceptionally strong and rigid and of such design that the two sections or halves of the tire carrying portion can be separated without first removing a large number of bolts, as is necessary with circumferentially split rims of the kind heretofore in use.

Another object is to provide a circumferentially split demountable rim whose sections are clamped securely together throughout the entire circumference of the rim by a retaining member that is normally held in operative engagement with said sections by a single fastening device. Other objects and desirable features of my invention will be hereinafter pointed out.

To this end I have devised a demountable rim composed of a circumferentially split tire carrying portion and a ring-shaped retaining member that securely clamps the sections of said tire carrying portion together in such a manner that it is impossible for said sections to separate or spread apart when said retaining member is in operative position. The retaining member is so constructed that it can be easily combined with or disassociated from the sections of the tire carrying portion of the rim, and in the preferred form of my invention, as herein illustrated, consists of a collapsible member arranged inside of the sections of the tire carrying portion and provided with a groove that receives coöperating ribs on said sections. The particular construction of the retaining member and the manner of combining said retaining member with the sections of the tire carrying portion are immaterial, however, so far as my broad idea is concerned, so long as the retaining member can be quickly applied or removed and is of such design that it will form practically a continuous clamp for the sections of the tire carrying portion.

Figure 1 of the drawings is a side elevational view of a demountable rim constructed in accordance with my invention.

Fig. 2 is a cross-sectional view, taken on the line 2—2 of Fig. 1.

Fig. 3 is an enlarged side elevational view of a portion of the rim.

Fig. 4 is an enlarged side elevational view of a portion of the retaining member, showing how the parts of same are hinged together.

Fig. 5 is a plan view of a portion of the retaining member, showing one of the hinges used to connect two of the parts of same together.

Fig. 6 is a horizontal sectional view, taken on the line 6—6 of Fig. 3.

Fig. 7 is a plan view, illustrating one means that can be used for preventing the sections of the tire carrying portion from creeping or moving circumferentially relatively to each other.

Fig. 8 is a transverse sectional view, taken on the line 8—8 of Fig. 7; and

Fig. 9 is an enlarged side elevational view of a portion of the rim, illustrating the transversely-disposed rib on the tire carrying portion that prevents said portion from moving circumferentially with relation to the retaining member.

Referring to the drawings which illustrate the preferred form of my invention, A designates two ring-shaped sections that constitute the tire carrying portion of the rim, said sections being divided or split by a joint extending circumferentially of the rim, thereby enabling said sections to be separated or spread apart easily to facilitate the removal or insertion of the inner tube of the tire in the outer casing, the sections A being provided with side flanges 1 of any preferred form that coöperate with beads on the outer casing of the tire to hold the tire on the tire carrying portion of the rim.

The sections A of the tire carrying portion are clamped together by a retaining member B which preferably consists of a collapsible ring-shaped member provided in its periphery with a groove 2, as shown in Fig. 2, that is adapted to receive coöperating annular ribs 3 on the sections A of the tire carrying portion, said groove 2 being so proportioned that when the retaining member B is in operative position the side walls of said groove will embrace the ribs 3 on the sections A, and thus clamp said sections securely together. If desired, the side walls of the groove 2 and the coöperating surfaces on the ribs 3 of the sections A can be tapered slightly, as shown in Fig. 2, so as to cause the sections A to be drawn snugly together when the retaining member B is expanded or forced into operative engagement with the tire carrying portion of the rim. The retaining member B can be formed in various ways without departing from the spirit of my invention, but I prefer to construct the retaining member B from a plurality of segmental-shaped parts 4, 5 and 6 that are joined together by hinges 7, and a relatively short end section 8 that is positioned opposite the free end of the segmental-shaped part 4 when the retaining member B is in operative position. By constructing the retaining member B in this manner I can remove it easily from the tire carrying portion of the rim by first removing the means that holds the retaining member B expanded and then swinging the end parts 4 and 8 of said member inwardly, as indicated in broken lines in Fig. 1, thereby permitting the retaining member B as an entirety to be dissociated from the tire carrying portion of the rim. After the retaining member B has been removed the sections A can be spread apart sufficiently to permit the inner tube of the tire to be inserted in the casing or withdrawn from the casing, it being possible to insert or remove the tube without disconnecting the sections A of the tire carrying portion from the beads of the outer casing of the tire. The retaining member B can be held in its expanded position in various ways without departing from the spirit of my invention. In the form of my invention herein illustrated the means used for this purpose consists of two oppositely-disposed wedges 9, as shown in Fig. 6, interposed between the free ends of the end parts 4 and 8 of the retaining member B, and a bolt 10 and coöperating nut 10ᵃ for drawing the wedges 9 toward each other, so as to cause them to exert pressure on the parts 4 and 8 of the retaining member in the direction indicated by the arrows in Fig. 6, thereby causing the member B to be expanded and forced into snug engagement with the sections A of the tire carrying portion. The bolt 10 is preferably securely connected to one of the wedges 9 and passes loosely through a hole in the other wedge 9, the nut 10ᵃ being arranged on the outside of the wedge through which the bolt 10 passes, so as to permit the locking device or expanding device to be manipulated easily either to expand the retaining member B or permit said retaining member to be collapsed preparatory to removing it from the tire carrying portion of the rim.

Means is preferably employed for preventing the sections A of the tire carrying portion from moving circumferentially relatively to each other, and means is also preferably employed for preventing the tire carrying portion as an entirety from moving circumferentially with relation to the retaining member B. In the rim herein illustrated one of the sections of the tire carrying portion is provided at one point with a lug or lateral extension 11 that fits in a recess 12 in the adjacent edge of the other section A of the tire carrying portion, as shown in Fig. 7, said lug or extension 11 having a notch or opening 11ᵃ in same, as shown in Fig. 7, for receiving the valve stem (not shown) of the inner tube of the tire. The retaining member B is also provided with an opening 13 for receiving the valve stem of the inner tube, and at a point in proximity to said opening 13 a transversely-disposed groove 14 is formed in the retaining member B, as shown in Fig. 9, so as to receive transversely-disposed ribs 15 on the sections A of the tire carrying portion, as clearly shown in Figs. 7, 8 and 9. In other words, the sections A of the tire carrying portion are provided on their meeting edges with coöperating means that interlock said sections with each other and prevent them from moving circumferentially with relation to each other, and the tire carrying portion and the retaining member B are provided with a coöperating transversely-disposed groove and ribs that prevent the tire carrying portion from moving circumferentially with relation to the retaining member B.

A demountable rim of the construction above described is exceptionally strong and rigid, as the sections of the tire carrying portion are of ring form, thus providing a supporting portion for the outer casing of the tire that will not spring out of shape, and said sections are clamped securely together by a continuous clamp or retaining member that extends throughout the entire circumference of the tire carrying portion. In addition to being exceptionally strong and rigid, such a rim has the added advantage of being able to be removed from or inserted in the outer casing of a pneumatic tire by simply manipulating a single fastening device, namely, the nut 10ᵃ on the bolt 10. This feature of my improved rim makes it greatly superior to the circumferentially split demountable rims heretofore in use, as all of the prior rims of this particular type with which I am familiar employ a large number of fastening devices for holding the two sections of the tire carrying portion of the rim together. With my improved rim it is only necessary to remove the nut 10ª on the bolt 10, then withdraw the wedges 9 and collapse the retaining member B, as shown in broken lines in Fig. 1, to release the two sections of the tire carrying portion. Obviously, the rim can be installed with equal ease by reversing the operations just described. In addition to the desirable features above pointed out, my improved rim is so constructed that it is impossible for the sections of the tire carrying portion to move or creep circumferentially or the tire carrying portion as an entirety to move or creep circumferentially of the retaining member B that holds the sections of the tire carrying portion together. I have not herein illustrated any means for mounting the complete rim on the felly of a wheel, as it is immaterial what means is employed for mounting the rim as an entirety.

Having thus described my invention, what I claim as new and desire to secure by Letters Patent, is

A demountable rim for vehicle wheels, comprising a tire carrying portion composed of two ring-shaped sections arranged in parallel relation, a lug on the edge of one of said sections that fits in a notch in the meeting edge of the other section, a retaining member arranged inside of said tire carrying portion and composed of a plurality of segmental-shaped parts hinged together in such a manner that a transverse joint is formed between the two end parts, an expansible means adapted to be arranged in the joint between the end parts for expanding said retaining member, means on said retaining member that embraces the sections of said tire carrying portion throughout the entire circumference of the rim, and a transversely-disposed rib on the tire carrying portion arranged in a transversely-disposed groove in the retaining member.

NICHOLAS SCHENK.